United States Patent
Yasui et al.

(10) Patent No.: US 7,253,583 B2
(45) Date of Patent: Aug. 7, 2007

(54) CONTROLLER FOR SYNCHRONOUS MACHINE

(75) Inventors: Kazuya Yasui, Tokyo (JP); Kazuaki Yuuki, Saitama (JP); Kentaro Suzuki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/356,310

(22) Filed: Feb. 17, 2006

(65) Prior Publication Data
US 2006/0202481 A1  Sep. 14, 2006

(30) Foreign Application Priority Data
Feb. 21, 2005  (JP)  ............................. 2005-044493

(51) Int. Cl.
*H02P 1/46* (2006.01)
*H02P 1/50* (2006.01)
*H02P 3/18* (2006.01)
*H02P 6/00* (2006.01)
*H02P 23/00* (2006.01)

(52) U.S. Cl. ..................... 318/717; 318/700; 318/811

(58) Field of Classification Search ..................... None
See application file for complete search history.

(56) References Cited
FOREIGN PATENT DOCUMENTS
JP  08-205578 A  8/1996

*Primary Examiner*—Lincoln Donovan
*Assistant Examiner*—Erick Glass
(74) *Attorney, Agent, or Firm*—Foley & Lardner LLP

(57) ABSTRACT

A controller for a synchronous machine includes: a power converter; a synchronous machine driven by the power converter; a PWM modulation section for controlling the synchronous machine; a current detection section which detects a current conducted to the synchronous machine; a voltage detection section which detects a voltage applied to the synchronous machine; a current variation operation section which operates a current variation during a time interval between timings synchronized with detection sampling in the current detection section; a voltage integration operation section which operates a voltage integration value during a time interval between the same timings as the timings in the current variation operation section; a current variation operation section for a time interval in which all sets are included, defining, as one set, the current variation and the voltage integration value, and operating a current variation during the time interval in which all the sets are included; a voltage integration operation section for the time interval in which all the sets are included, integrating a voltage during the same time interval as the time interval in the current variation section for the time interval in which all the sets are included; and a rotation phase angle assumption section which assumes a rotation phase angle of the synchronous machine.

8 Claims, 6 Drawing Sheets

CONTROLLER FOR SYNCHRONOUS MACHINE

CROSS-REFERENCE TO RELATED APPLICATION

This application is based upon and claims the benefit of priority from the prior Japanese Patent Application No. 2005-044493, filed on Feb. 21, 2005; the entire contents of which are incorporated herein by reference.

BACKGROUND OF THE INVENTION

1. Field of the Invention

The present invention relates to a controller for a synchronous machine.

2. Description of the Related Art

In general, in a controller for a synchronous machine (an electric motor, a generator), a detector which detects a rotation phase angle of a rotor is required in order to perform a drive control for the synchronous machine. However, problems as will be described below are inherent in the controller using the detector. First, the presence of the detector increases a volume of the synchronous machine. Thus, expansion of an output of the synchronous machine is inhibited. Second, maintenance/inspection work for the detector itself becomes necessary. Thus, maintenance/inspection efficiency is deteriorated. Third, disturbance occurs on a detected value because of superposition of noise and the like on a signal line from the detector, and control performance is deteriorated. Fourth, most of the detectors require power supplies for driving themselves, and it is necessary to provide the power supplies belonging to other systems than those for synchronous machine drive sources. This causes an increase of loads on a power supply installation space, a power supply line, cost, and the like.

In consideration of the problems as described above, in recent years, there has been developed a control method of assuming the rotation phase angle without using the detector, and performing the drive control based on the assumed rotation phase angle. This method is called a "sensorless control".

As a controller for the synchronous machine, which includes such sensorless controlling means, for example, in Japanese Patent Laid-Open Publication No. H8-205578 (published in 1996)), there is disclosed a technology, in which, in a system of driving the synchronous machine by a pulse width modulation (hereinafter, referred to as PWM) inverter, a variation of an output current generated by a PWM control and a variation of a time integration value of an output voltage are detected in synchronization with switching of the PWM, and the rotation phase angle is detected based on a current/voltage equation of the synchronous machine by using detected values thereof.

However, in the controller for the synchronous machine, which is as described above, since the rotation phase angle of the synchronous machine is assumed by using high-frequency components of the voltage and the current which are generated by the PWM, it is necessary to measure the current and the voltage at an arbitrary detection point, or to measure the current and the voltage by high-frequency sampling (such sampling will be referred to as high-speed sampling) of which frequency is higher than a switching frequency of the PWM. Heretofore, with regard to such current and voltage, input voltages obtained from individual measuring instruments have been converted into digital signals by an analog/digital converter (hereinafter, referred to as an AD converter), and a control operation has been performed therefor by using the digital signals. However, a special circuit and an expensive AD converter have been required in order to perform the measurement at the arbitrary point and the measurement using the high-speed sampling.

SUMMARY OF THE INVENTION

The present invention has been made in order to solve the above-described problems. It is an object of the present invention to provide a controller for a synchronous machine, which is capable of assuming the rotation phase angle surely by using an AD converter of which sampling frequency is low.

In order to achieve the above-described object, an aspect of the present invention is summarized to be a controller for a synchronous machine, including: a power converter which alternately converts direct current power and alternating current power; a synchronous machine driven by the power converter; a PWM modulation section which performs PWM modulation for a voltage command value for controlling the synchronous machine; a current detection section which detects a current conducted to the synchronous machine at predetermined sampling timing; a voltage detection section which detects a voltage applied to the synchronous machine; a first current variation operation section which operates a current variation during a time interval between timings synchronized with the detection sampling in the current detection section; a first voltage integration operation section which operates a voltage integration value during a time interval between the same timings as the timings in the current variation operation section; a second current variation operation section for a time interval in which all sets are included, defining, as one set, the current variation of the first current variation operation section and the voltage integration value of the first voltage integration operation section during the time interval between the same timings, and operating a current variation during a time interval in which all operation timings of a plurality of the sets are included; a second voltage integration operation section for the time interval in which all the sets are included, operating a voltage integration value during the same time interval as the time interval of the of the second current variation operation section; and a rotation phase angle assumption section which assumes a rotation phase angle of the synchronous machine by using the plurality of respective sets, the time intervals corresponding to the respective sets, the current variation and the voltage integration value during the time interval in which all the operation timings of the plural sets are included, and the time interval in which all the operation timings of the plural sets are included.

According to the aspect of the present invention, the phase angle assumption can be surely realized by using the current detection section, the voltage detection section, the AD converter of which sampling frequency is low, and the operation processing unit, which are equipped in the controller for the general synchronous machine, without using a special circuit configuration or a special high-speed AD converter.

DETAILED DESCRIPTION OF THE INVENTION

A description will be made below of embodiments of the present invention with reference to the drawings.

FIRST EMBODIMENT

Figure 1:
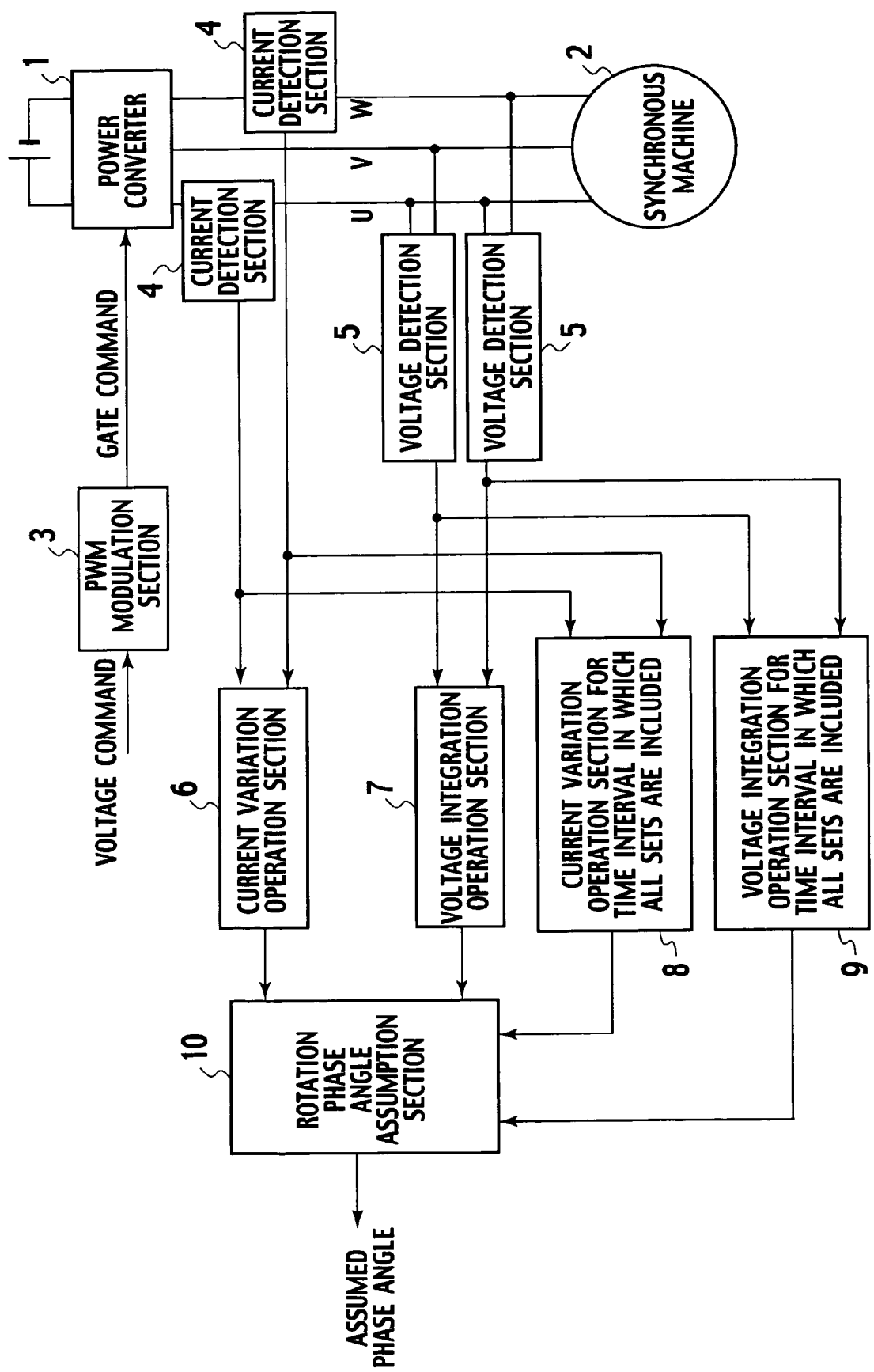
FIG. 1 is a block diagram of a controller for a synchronous machine according to a first embodiment of the present invention.

FIG. 1 is a block diagram showing a controller for a synchronous machine according to a first embodiment of the present invention. The controller for the synchronous machine according to the first embodiment is composed of a power converter 1, a synchronous machine 2, a PWM modulation section 3, current detection sections 4, voltage detection sections 5, a current variation operation section (a first current variation operation section) 6, a voltage integration operation section (a first voltage integration operation section) 7, a current variation operation section (a second current variation operation section) 8 for a time interval in which all sets are included, a voltage integration operation section (a second voltage integration operation section) 9 for the time interval in which all the sets are included, and a rotation phase angle assumption section 10.

The power converter 1 receives a gate command for driving the power converter 1 from the PWM modulation section 3, and switches a switching element built in the power converter 1, thereby converting alternating current/direct current powers alternately. FIG. 1 shows a configuration of converting the direct current power and three-phase alternating current powers.

The synchronous machine 2 receives a supply of the three-phase alternating currents, and generates torque by currents conducted to the respective excitation phases, thereby rotating. In general, in a control for the synchronous machine, a rotation angle thereof is measured, and the exciting currents are changed in synchronization with the rotation angle. Accordingly, a detector of the rotation angle is required. For example, in a control for a permanent magnet synchronous machine using a permanent magnet for a rotor, a magnetic flux direction (N-pole direction) of the permanent magnet from a reference angle is detected as a rotation phase angle, and a voltage is applied to the synchronous machine and a current is conducted thereto depending on a direction of the rotation phase angle.

The PWM modulation section 3 receives three-phase voltage commands for controlling the synchronous machine 2, and creates and outputs gate commands for switching ON/OFF the respective switching elements of the power converter 1, for example, by PWM modulation.

The current detection sections 4 are arranged on power lines between the power converter 1 and the synchronous machine 2, and measure currents conducted to the power lines. In general, with regard to the three-phase alternating currents conducted to the synchronous machine 2, if currents of two phases among the three phases are detected, then current values of all the three phases can be obtained. Accordingly, FIG. 1 shows such a configuration as a representative example.

The voltage detection sections 5 are arranged between the respective phases of the power lines between the power converter 1 and the synchronous machine 2, and measure voltages between the respective phases of the power lines. FIG. 1 shows a configuration of measuring the voltages (voltage between U and V, voltage between W and U) between the two lines because of a similar reason to that of the power detection sections 4. Moreover, in general, it is also possible to obtain the three-phase voltages by an operation from a direct current voltage applied to the power converter 1 and the gate commands inputted to the power converter 1. Moreover, if the direct current voltage is not varied frequently, then it is also possible to obtain the three-phase voltages by the operation only from the gate commands. In this case, it is not necessary to lay wires for detecting the voltages between the two lines as shown in FIG. 1, and the apparatus can be simplified.

The current variation operation section 6 records the current values inputted from the current detection sections 4, and operates variations of the current values between arbitrary timings. In usual, it is voltage values proportional to the current values that are inputted from the current detection sections 4. The voltage values are converted into digital values by using an AD converter, and the digital values are used as the current values. In this case, since the AD converter can perform only discrete processing, there are points for current detection sampling.

Figure 2:
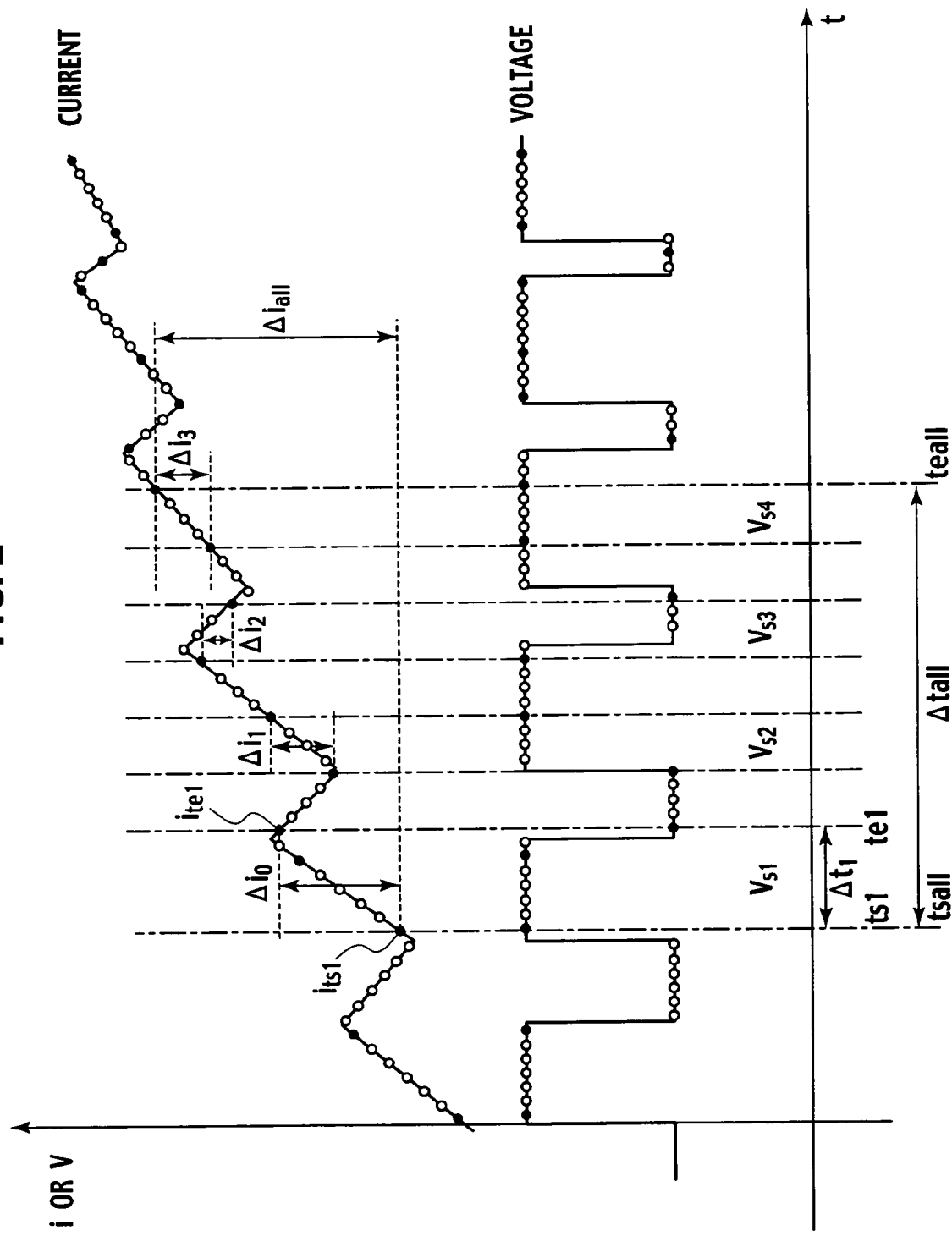
FIG. 2 is a chart showing a change of a current and a concept of detection sampling thereof according to the first embodiment of the present invention.

FIG. 2 is a chart showing a change of a current and a concept of detection sampling thereof. An axis of abscissas represents a time t, and an axis of ordinates represents a current i or a voltage V. FIG. 2 show detection samplings as dots. As shown by black dots of FIG. 2, the power variation operation section 6 operates a current variation Δi during an arbitrary time interval as in Expression 1, and outputs the operated current variation.

$$\Delta i_k = i_{tek} - i_{tsk}$$ [Expression 1]

A starting point and an end point which define the time interval are synchronized with timing of sampling each current value inputted from the current detection sections 4. Thus, the current variation can be directly operated by a simple difference operation. Moreover, the starting point and the end point can be arbitrarily selected from the sampling points synchronized with the sampling of the current values. FIG. 2 shows a configuration in which the sampling points are arbitrarily selected without being bound by a fixed rule. Thus, for example, even in the case where it is assumed that an abnormal current value is detected owing to, for example, influences of noise and the PWM switching, and the like, it is made possible to select only samplings in which normal values can be detected while evaluating the detected current values, and a phase angle assuming operation to be described below can be performed accurately. Moreover, since the sampling points can be arbitrarily selected, a high-performance AD converter for high-speed sampling, sampling coping with triggers, and the like are not required, an inexpensive AD converter can be used, and a cost reduction of the apparatus can be realized.

The voltage integration operation section 7 records the voltage values inputted from the voltage detection sections 5, and operates an integration of the voltage value between arbitrary timings. Also in the detection of the voltage values, there is detection sampling in a similar way to the current detection as shown in FIG. 2. FIG. 2 shows a configuration of detecting the voltage values by the same sampling as that of the current detection. However, as in the description of the voltage detection sections 5, in the case of operating the voltages by using the gate commands, it is possible to operate the voltages by the operation sampling according to the gate commands. Accordingly, in general, the voltage values can be detected by higher-speed sampling than the current detection sampling. This is because the gate command operation according to the PWM is operated by such an operation processing unit as a microcomputer in many cases, and the operation sampling according to the PWM by the microcomputer is as extremely high-speed as several ten to several hundred nanoseconds [nsec]. As opposed to this, it is general that a speed of the sampling by the AD converter for use in the current detection and the like is several to several ten microseconds [μsec], which can be said to be a lower speed than that of the operation sampling by the microcomputer. For example, if it is assumed that the speed of the PWM operation sampling by the microcomputer is 100 [nsec], and that the speed of the sampling by the AD converter is 5 [μsec], then the voltage detection sampling can be performed approximately 50 times while the current detection sampling is being performed twice. In the case of such a configuration, it is made easily possible to perform the voltage detection sampling in synchronization with the current detection sampling. Besides the above, it is possible to individually provide an AD converter for the current detection and an AD converter for the voltage detection, and to synchronize conversion timings of these AD converters with each other. Accordingly, the synchronization of the voltage detection sampling with the current detection sampling causes no problem on practical use.

As in Expression 2, the voltage integration operation section 7 performs an integration operation for a voltage value during the same time interval as that of the current detection sampling between the starting point and the end point which are selected in the current variation operation section 6, and outputs the operated voltage value.

$$V_{sk} = \int_{sk}^{ck} V dt \quad \text{[Expression 2]}$$

The current variation operation section 8 for the time interval in which all the sets are included defines, as one set, the current variation Δi operated by the current variation operation section 6, and the voltage integration value operated during the same time interval as that of the current variation Δi, and operates, for plural sets selected arbitrarily, a current variation $\Delta i_{all}$ during a time interval which includes all the sets.

The voltage integration operation section 9 for the time interval in which all the sets are included operates a voltage integration during the same time interval as that in the current variation operation section 8 for the time interval in which all the sets are included.

The respective operation results obtained by the operations of the current variation operation section 6 and the voltage integration operation section 7 are inputted to the rotation phase angle assumption section 10. Moreover, the respective operation results obtained by the operations of the current variation operation section 8 for the time interval in which all the sets are included and the voltage integration operation section 9 for the time interval in which all the sets are included are also inputted to the rotation phase angle assumption section 10. The rotation phase angle assumption section 10 assumes the rotation phase angle of the synchronous machine based on the values inputted from the current variation operation section 6, and the voltage integration operation section 7, the current variation operation section 8 for the time interval in which all the sets are included, and the voltage integration operation section 9 for the time interval in which all the sets are included.

A description will be made below of an assumption operation method of the rotation phase angle. First, a description will be made of a principle which enables the assumption for the rotation phase angle of the synchronous machine 2. A voltage equation of the synchronous machine 2 is represented as in Expression 3 in a vector control coordinate system as a coordinate system which rotates in synchronization with the rotation of the synchronous machine.

$$\begin{bmatrix} v_d \\ v_q \end{bmatrix} = \begin{bmatrix} R + pL_d & -\varpi L_q \\ \varpi L_d & R + pL_q \end{bmatrix} \begin{bmatrix} i_d \\ i_q \end{bmatrix} + \begin{bmatrix} 0 \\ \varpi \Phi \end{bmatrix} \quad \text{[Expression 3]}$$

Figure 3:
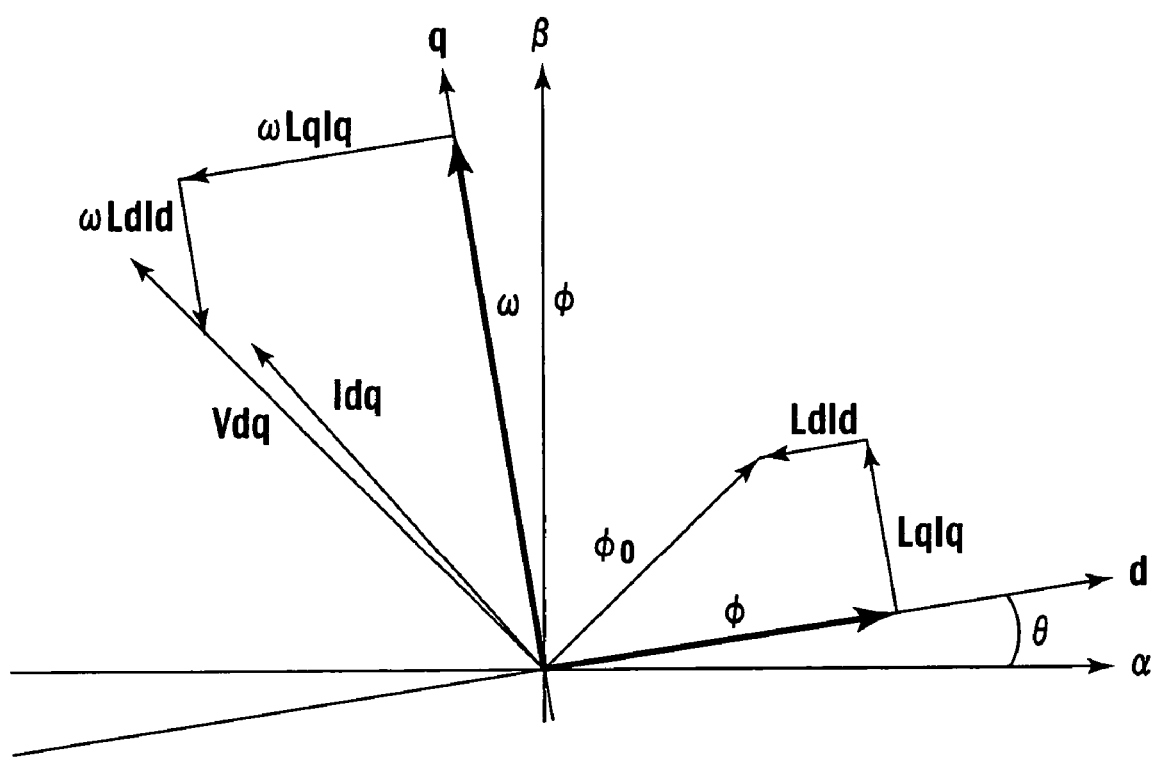
FIG. 3 is a diagram explaining a concept of a vector control coordinate system according to the first embodiment of the present invention.

FIG. 3 is a diagram explaining a concept of the vector control coordinate system. When Expression 3 is expressed by using a rest frame Σαβ in FIG. 3, Expression 4 is obtained.

$$\begin{bmatrix} v_\alpha \\ v_\beta \end{bmatrix} = r \begin{bmatrix} i_\alpha \\ i_\beta \end{bmatrix} + \begin{bmatrix} L_0 + L_1 \cos 2\theta & L_1 \sin 2\theta \\ L_1 \sin 2\theta & L_0 - L_1 \cos 2\theta \end{bmatrix} \begin{bmatrix} pi_\alpha \\ pi_\beta \end{bmatrix} + \begin{bmatrix} e_\alpha \\ e_\beta \end{bmatrix}$$

$$= r i + \begin{bmatrix} L_{11} & L_{12} \\ L_{21} & L_{22} \end{bmatrix} i + e \quad \text{[Expression 4]}$$

Since $L_{11}$ to $L_{22}$ included in Expression 4 are functions of the rotation phase angle θ, it is made possible to assume the rotation phase angle θ if $L_{11}$ to $L_{22}$ can be operated.

Since $L_{11}$ to $L_{22}$ are coefficients of current differential items in Expression 4, a relationship as in the following Expression 5 can be derived by using the above-described principle when attention is paid to the high-frequency components of the current/voltage.

$$\tilde{v} = L \frac{d}{dt} \tilde{i} \quad \text{[Expression 5]}$$

where $\tilde{v}$: high-voltage high-frequency component $\tilde{i}$: current high-frequency component When the high-frequency components of the currents and the voltages at different times are aggregated, Expression 5 can be expressed in a matrix as shown below.

$$\begin{bmatrix} \tilde{v}_{0\alpha} & \tilde{v}_{1\alpha} & \cdots & \tilde{v}_{k\alpha} \\ \tilde{v}_{0\beta} & \tilde{v}_{1\beta} & \cdots & \tilde{v}_{k\beta} \end{bmatrix} = L \begin{bmatrix} \frac{\Delta \tilde{i}_{0\alpha}}{\Delta t_{0\alpha}} & \frac{\Delta \tilde{i}_{1\alpha}}{\Delta t_{1\alpha}} & \cdots & \frac{\Delta \tilde{i}_{k\alpha}}{\Delta t_{k\alpha}} \\ \frac{\Delta \tilde{i}_{0\beta}}{\Delta t_{0\beta}} & \frac{\Delta \tilde{i}_{1\beta}}{\Delta t_{1\beta}} & \cdots & \frac{\Delta \tilde{i}_{k\beta}}{\Delta t_{k\beta}} \end{bmatrix} \quad \text{[Expression 6]}$$

By modifying Expression 6 into the following Expressions 7 to 9, an approximate solution of an inductance matrix composed of $L_{11}$ to $L_{22}$ can be operated.

$$L \begin{bmatrix} \Delta \tilde{i}_{0\alpha} & \Delta \tilde{i}_{1\alpha} & \cdots & \Delta \tilde{i}_{k\alpha} \\ \Delta \tilde{i}_{0\beta} & \Delta \tilde{i}_{1\beta} & \cdots & \Delta \tilde{i}_{k\beta} \end{bmatrix} = \begin{pmatrix} \tilde{V}_{0\alpha} \Delta t_0 & \tilde{V}_{1\alpha} \Delta t_1 & \cdots & \tilde{V}_{k\alpha} \Delta t_k \\ \tilde{V}_{0\beta} \Delta t_0 & \tilde{V}_{1\beta} \Delta t_1 & \cdots & \tilde{V}_{k\beta} \Delta t_k \end{pmatrix}$$ [Expression 7]

$$\begin{bmatrix} \Delta \tilde{i}_{0\alpha} & \Delta \tilde{i}_{0\beta} \\ \Delta \tilde{i}_{1\alpha} & \Delta \tilde{i}_{1\beta} \\ \vdots & \vdots \\ \Delta \tilde{i}_{k\alpha} & \Delta \tilde{i}_{k\beta} \end{bmatrix} L^T = \begin{bmatrix} \tilde{V}_{0\alpha} \Delta t_0 & \tilde{V}_{0\beta} \Delta t_0 \\ \tilde{V}_{1\alpha} \Delta t_1 & V\tilde{i}_{1\beta} \Delta t_1 \\ \vdots & \vdots \\ \tilde{V}_{k\alpha} \Delta t_k & \tilde{V}_{k\beta} \Delta t_k \end{bmatrix}$$ [Expression 8]

$$L^T = \begin{bmatrix} \Delta \tilde{i}_0^T \\ \Delta \tilde{i}_1^T \\ \vdots \\ \Delta \tilde{i}_k^T \end{bmatrix}^{LM} \begin{bmatrix} \tilde{V}_0^T \Delta t_0 \\ \tilde{V}_1^T \Delta t_1 \\ \vdots \\ \tilde{V}_k^T \Delta t_k \end{bmatrix}$$

$$= \begin{bmatrix} L_{11} & L_{12} \\ L_{21} & L_{22} \end{bmatrix}^T$$

$$= \begin{bmatrix} L_0 + L_1 \cos 2\theta & L_1 \sin 2\theta \\ L_1 \sin 2\theta & L_0 - L_1 \cos 2\theta \end{bmatrix}^T$$ [Expression 9]

where superscript T represents a transpose matrix, and superscript LM represents a left-side pseudo inverse matrix.

The aggregations of the current and voltage high-frequency components can be operated from the aggregations (corresponding to subscript numerals and k) of the sets of the current variations and the voltage integration values during the same time intervals, which are operated by the current variation operation section 6 and the voltage integration operation section 7, and from the current variation and the voltage integration value during a time interval including the entire aggregation of these plural sets. An operation method is shown in Expression 10 and Expression 11.

$$\tilde{V}_k = \frac{V_{sk}}{\Delta t_k} - \frac{V_{sall}}{\Delta t_{all}}$$ [Expression 10]

$$\tilde{i}_k = \Delta i_k - \Delta i_{all}$$ [Expression 11]

The rotation phase angle of the synchronous machine can be obtained as in Expression 12 from the inductance matrix obtained by the above-described Expressions.

$$2\theta = \tan^{-1} \frac{L_{12} + L_{21}}{L_{11} - L_{22}}$$ [Expression 12]

In Expression 12, the rotation phase angle is obtained as a double angle. Accordingly, the assumed phase angle θ itself can be easily operated by application of doubler phase locked loop (PLL). Here, the assumed phase angle θ obtained from the double angle becomes either 0° or 180° as an actual phase angle. Thus, it can be determined whether the assumed phase angle θ coincides with 0° or 180° by for example, performing polarity (NS) determination, and based on a determination result, it is made possible to allow the assumed phase angle and the actual phase angle to completely coincide with each other.

According to the first embodiment, the phase angle assumption can be surely realized by the current detection sections 4, the voltage detection sections 5, the AD converter, and the operation processing unit, which are equipped in the controller for the general synchronous machine, and a special circuit configuration or a special expensive AD converter is not required.

SECOND EMBODIMENT

A second embodiment of the present invention has a feature in that a configuration is adopted, in which both of the starting point and the end point which define the time interval in the case of operating the set of the current variation and the voltage integration value in the first embodiment are selected so as to coincide with current detection sampling within a time while one space voltage vector is being outputted from the power converter 1.

Figure 4:
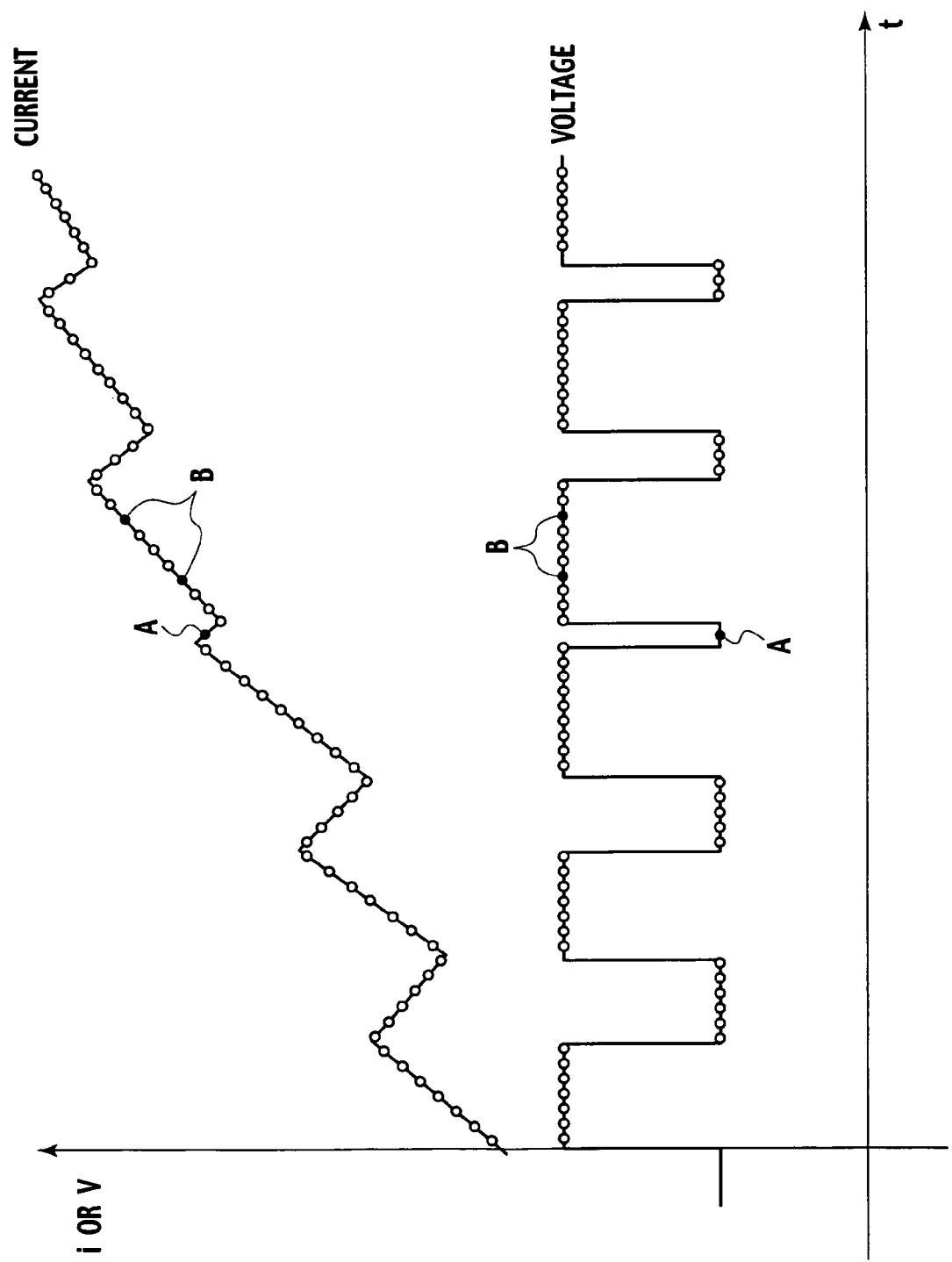
FIG. 4 is a chart showing a change of a current and a concept of detection sampling thereof according to a second embodiment of the present invention.

FIG. 4 is a chart showing a change of a current and a concept of the detection sampling thereof according to the second embodiment of the present invention. When an output time of one space voltage vector is short, and the current detection is not performed twice or more within the time (the current detection sampling is performed once), current detection sampling concerned is not selected. When the current detection sampling is performed three times or more within the time while one space voltage vector is being outputted, any sampling may be selected. An arrow A of FIG. 4 shows the case where the sampling is performed only once during the output of one voltage vector which is not zero. In this case, current detection sampling concerned is not selected. An arrow B of FIG. 4 shows the case where there are two samplings during the output of one voltage vector which is not zero. In this case, current detection samplings concerned are selected.

According to the second embodiment, it is made possible to operate a variation in which a change per unit time is the largest among the current changes of the synchronous machine 2, and assuming precision of the rotation phase angle can be enhanced.

THIRD EMBODIMENT

Figure 5:
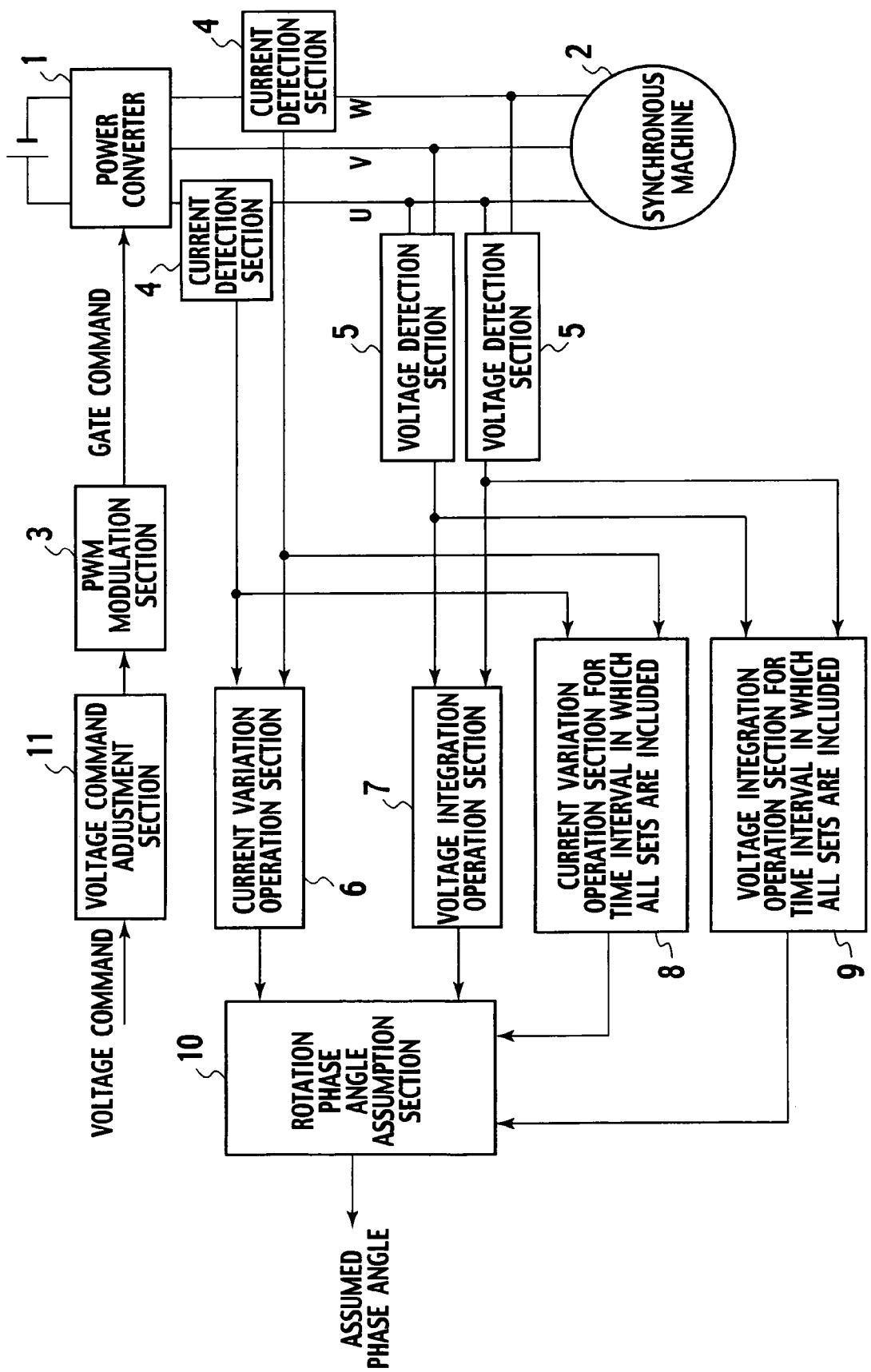
FIG. 5 is a block diagram of a controller for the synchronous machine according to a third embodiment of the present invention.

FIG. 5 is a block diagram of a controller for the synchronous machine according to a third embodiment of the present invention. Note that the same reference numerals are used for the same constituents as those of FIG. 1. In the third embodiment, a configuration is adopted, in which there is added a voltage command adjustment section 11 which adjusts the voltage command inputted to the PWM modulation section 3 so that, even if the output time of one space vector outputted after the PWM modulation is the minimum in the case of operating the voltage command, the current detection sampling can be performed twice or more within the above-described output time. As an adjustment method of the voltage command, a method of superposing predetermined high-frequency components on one another in the voltage command is mentioned.

According to the third embodiment, in such a case where the voltage command inputted to the PWM modulation section 3 is low, the number of current detection samplings is not lowered to less than two within the output time of the space voltage vector, and it is made possible to operate the current variations and the voltage integration values in all the output space voltage vectors. In the second embodiment, when the current detection sampling is performed once within the output time of the space voltage vector, the sampling concerned is not selected, and accordingly, a waste occurs in the sampling. In the third embodiment, it is made possible to use all the samplings for the operation without being wasted, and the assuming precision can be further enhanced.

FOURTH EMBODIMENT

A fourth embodiment of the present invention has a feature in that a configuration is adopted, in which two timings $i_{ts1}$ and $i_{te1}$ corresponding to the starting point and the end point which define the time interval when the current variation and the voltage integration value are operated are selected from the current detection sampling shown in FIG. 2 so as to have such a time interval when plural space voltage vectors are outputted from the power converter 1 during the operation time interval, and the two timings $i_{ts1}$ and $i_{te1}$ are selected so as to be synchronized with the current sampling timing. In FIG. 2, in $\Delta i_2$, the operation as described above is performed.

According to the fourth embodiment, for example, when the current detection sampling is performed at a low speed, and a cycle thereof exceeds the time while the plural space voltage vectors are being outputted, and also when the current detection value by certain current detection sampling becomes abnormal and unadoptable, it is made possible to perform the assumption normally without a deterioration of the assuming precision or incapability of the operation.

FIFTH EMBODIMENT

A fifth embodiment of the present invention has a feature in that a configuration is adopted, in which the time interval of the current variation is selected so as to be most approximated to a time of a half cycle of a carrier wave in the PWM modulation section 3.

In general, with regard to the control for the synchronous machine by the microcomputer, in many cases, the voltage command value is outputted and modulated every half cycle of the carrier wave in the PWM modulation section 3. This means that the voltage command value is changed every half cycle of the carrier wave, and in the current of the synchronous machine 2 driven by this voltage command value, a current change appears every half cycle of the carrier eave. In this fifth embodiment, the configuration is adopted, in which the current detection sampling is selected so that the time interval of the current variation operation can be most approximated to the half cycle of the carrier wave, thus making it possible to detect the current variation.

The fifth embodiment is adapted to select the current detection sampling so that the time interval of the current variation operation can become the half cycle of the carrier wave, thus making it possible to arbitrarily select the starting point/end point of the time interval. For example, such selection methods are possible, as selecting the starting point/end point so as to coincide with upper and lower peaks of the carrier wave, and selecting a point at which a zero-voltage vector of the space voltage vector is started to be outputted as the starting point and selecting a point at which the next zero-voltage vector is started to be outputted as the end point. Moreover, in the case where the voltage command value is outputted based on the control for the synchronous machine by the microcomputer not every half cycle of the carrier wave but every one cycle of the carrier wave, it is also possible to make a setting so that the time interval of the current variation operation can coincide with this one cycle.

According to the fifth embodiment, it is made possible to operate the current variation by a change of the voltage command of every half cycle of the carrier wave, and the assuming precision of the rotation phase angle can be enhanced.

SIXTH EMBODIMENT

Figure 6:
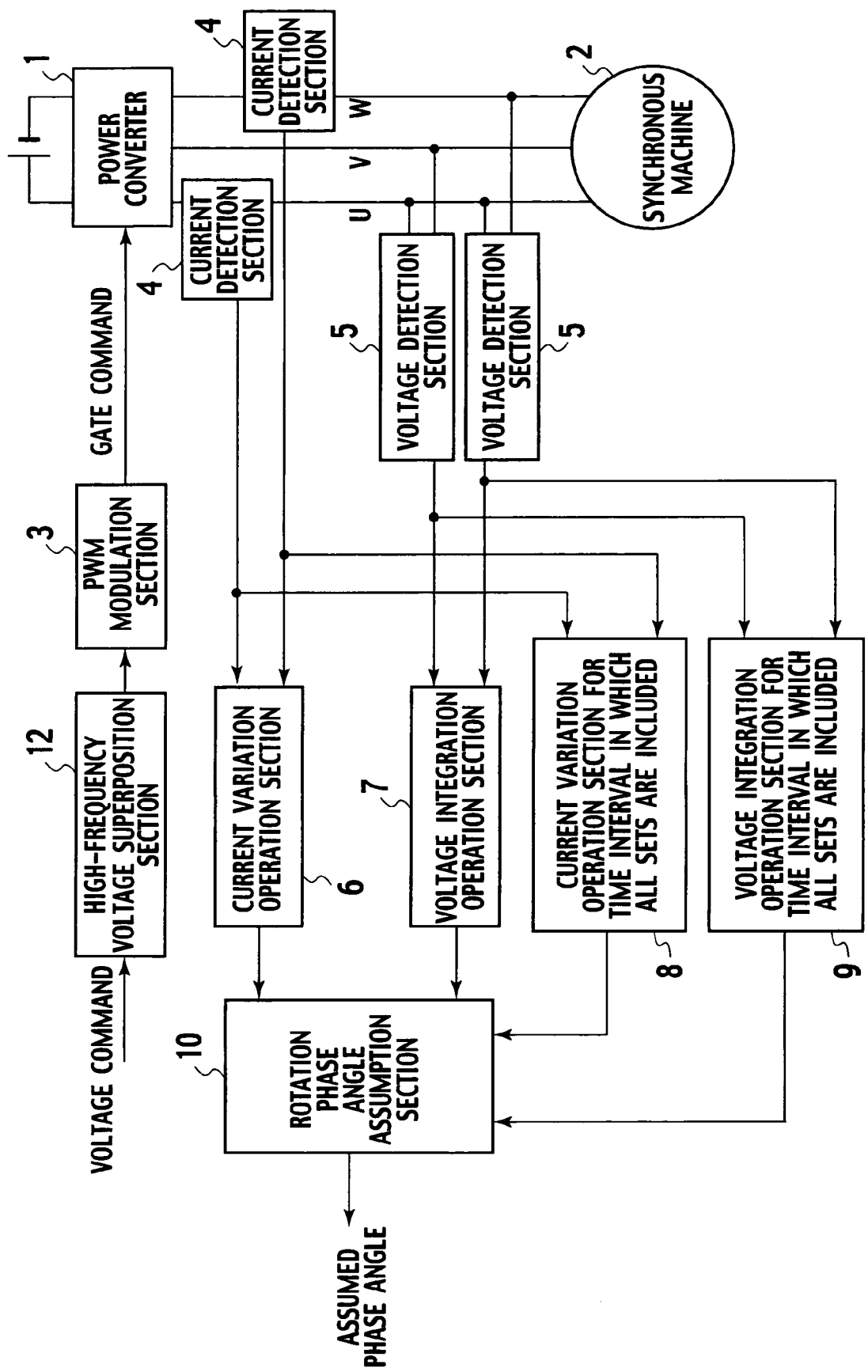
FIG. 6 is a block diagram of a controller for the synchronous machine according to a sixth embodiment of the present invention.

FIG. 6 is a block diagram of a controller for the synchronous machine according to a sixth embodiment of the present invention. The same reference numerals are used for the same constituents as those in FIG. 1 and FIG. 3. In the sixth embodiment, a configuration is adopted, in which there is added a high-frequency voltage superposition section 12 which superposes high-frequency voltages synchronized with the carrier wave on one another to the configuration of the controller for the synchronous machine according to the first embodiment.

In the fifth embodiment, the description has been made of the configuration of operating the current variation caused by the fact that the voltage command is changed every half cycle of the carrier wave. However, when the change of the voltage command is small, the current change caused thereby also becomes small. When the current change is small, there may occur the case where the high-frequency component of the current, which is assumed by the rotation phase angle assumption section 10, cannot be detected precisely. In the sixth embodiment, the high-frequency voltages synchronized with the carrier wave are superposed on one another so that the change of the voltage command can be made large. In general, the frequency of the carrier wave is sufficiently higher than a drive frequency of the synchronous machine, and accordingly, the superposition of the high-frequency voltages does not affect the control for the synchronous machine.

According to the sixth embodiment, the change of the voltage command of every half cycle can be made large by the superposition of the high-frequency voltages, it is made possible to precisely operate the voltage variation by the change of the voltage command of every half cycle of the carrier wave, and the assuming precision of the rotation phase angle can be enhanced.

SEVENTH EMBODIMENT

In the first to sixth embodiments, the configuration has been adopted, in which the operations of the current variation and the voltage integration value are synchronized with the detection sampling in the current detection sections 4. However, there is also a case where it is better to select the detection sampling in the voltage detection sections 5 as the sampling to be synchronized with, and a seventh embodiment has a feature in that such a configuration as described above is adopted.

The case where it is better to synchronize the above-described operations with the detection sampling in the voltage detection sections 5 is a case, for example, where the voltage detection sampling is lower speed than the current detection sampling. In this case, it becomes difficult to synchronize the former one with the latter one, and accordingly, it is made impossible to operate the current variation and the voltage integration value during the same time interval. In the seventh embodiment, the configuration is adopted, in which the time interval during which the current variation and the voltage integration value are operated is set at the timing synchronized with the voltage detection sampling.

According to the seventh embodiment, in such a case where the voltage detection sampling is lower speed than the current detection sampling, it is made possible to perform the assumption operation normally without the deterioration of the assuming precision or the incapability of the operation.

Note that the present invention is not limited to the above-described embodiments, and it is possible to add a variety of modifications thereto without departing from the gist of the invention.

What is claimed is:

1. A controller for a synchronous machine, comprising:
   a power converter which alternately converts direct current power and alternating current power;
   a synchronous machine driven by the power converter;
   a PWM modulation section which performs PWM modulation for a voltage command value for controlling the synchronous machine;
   a current detection section which detects a current conducted to the synchronous machine at predetermined sampling timing;
   a voltage detection section which detects a voltage applied to the synchronous machine;
   a first current variation operation section which operates a current variation during a time interval between timings synchronized with the detection sampling in the current detection section;
   a first voltage integration operation section which operates a voltage integration value during a time interval between the same timings as the timings in the first current variation operation section;
   a second current variation operation section defining, as one set, the current variation of the first current variation operation section and the voltage integration value of the first voltage integration operation section during the time interval between the same timings, and operating a current variation during a time interval in which all operation timings of a plurality of the sets are included;
   a second voltage integration operation section operating a voltage integration value during the same time interval as the time interval of the second current variation operation section; and
   a rotation phase angle assumption section which assumes a rotation phase angle of the synchronous machine by using the plurality of respective sets, the time intervals corresponding to the respective sets, the current variation and the voltage integration value during the time interval in which all the operation timings of the plural sets are included, and the time interval in which all the operation timings of the plural sets are included.

2. The controller for a synchronous machine according to claim 1,
   wherein both two timings corresponding to a starting point and an end point, the points defining the time interval during which the current variation and the voltage integration value are operated, are synchronized with current sampling timing caused while one space voltage vector is being outputted from the power converter.

3. The controller for a synchronous machine according to claim 1, further comprising a voltage command adjustment section which adjusts the voltage command value so that the detection sampling in the current detection section can be performed twice or more within a shortest output time of a space voltage vector outputted after the modulation by the PWM modulation section.

4. The controller for a synchronous machine according to claim 1, wherein two timings corresponding to a starting point and an end point, the points defining the time interval during which the current variation and the voltage integration value are operated, are selected so that plural space voltages can be outputted from the power converter during the time interval, and are synchronized with the current sampling timing.

5. The controller for a synchronous machine according to claim 1, wherein two timings corresponding to a starting point and an end point, the points defining the time interval during which the current variation and the voltage integration value are operated, are synchronized with current sampling timing selected so that the time interval can be most approximated to a time of a half cycle of a carrier wave in the PWM modulation section.

6. The controller for a synchronous machine according to claim 1, wherein two timings corresponding to a staring point and an end point, the points defining the time interval during which the current variation and the voltage integration value are operated, are synchronized with current sampling timing selected so that the time interval can be most approximated to a time of one cycle of a carrier wave in the PWM modulation section.

7. The controller for a synchronous machine according to claim 1, further comprising a high-frequency voltage superposition section which superposes high-frequency voltages synchronized with a carrier wave in the PWM modulation section.

8. The controller for a synchronous machine according to claim 1,
   wherein the timings which define the time interval in the first voltage integration operation section are synchronized with the sampling timing in the voltage detection section, and
   the first current variation operation section operates a current variation during a time interval between the same timings as the timings of the first voltage integration operation section.

* * * * *